United States Patent [19]

Kachik

[11] 4,110,887

[45] Sep. 5, 1978

[54] METHOD OF REPAIRING SLAG AND CINDER POTS AND OTHER HEAVY STEEL ARTICLES

[75] Inventor: Robert H. Kachik, Washington Township, Westmoreland County, Pa.

[73] Assignee: United States Steel Corporation, Pittsburgh, Pa.

[21] Appl. No.: 790,516

[22] Filed: Apr. 25, 1977

[51] Int. Cl.$^2$ ...................... B23K 23/00; B22D 19/10
[52] U.S. Cl. .................... 29/401 A; 164/54
[58] Field of Search ............ 29/401 R, 401 A, 401 E, 29/402; 164/54, 53, 92, DIG. 12; 228/241

[56] References Cited

U.S. PATENT DOCUMENTS

| | | | |
|---|---|---|---|
| 3,421,570 | 1/1969 | Guntermann | 164/53 |
| 3,942,578 | 3/1976 | Kachik et al. | 164/54 |
| 4,005,742 | 2/1977 | Kachik et al. | 164/54 |
| 4,055,881 | 11/1977 | La Bate | 29/401 A |

FOREIGN PATENT DOCUMENTS 47-13744  4/1972  Japan ......................... 29/402

*Primary Examiner*—Milton S. Mehr
*Attorney, Agent, or Firm*—Forest C. Sexton

[57] ABSTRACT

A method of repairing erosion cavities in large steel articles, such as slag and cinder pots by employing a plurality of successive aluminothermic reduction reaction charges without using containment perimeters and without preheating the article. The resultant repaired article has a metallurgically bonded plug in the eroded surface.

8 Claims, 3 Drawing Figures

METHOD OF REPAIRING SLAG AND CINDER POTS AND OTHER HEAVY STEEL ARTICLES

This invention relates to a relatively inexpensive method for repairing erosion cavities in large steel articles such as slag and cinder pots which utilize an aluminothermic reduction (ATR) bulk metal deposition process to effect such repair.

A practical method for the repair of slag and cinder pots damaged or eroded in service has been in great demand by steelmakers because performance of such equipment relates directly to the cost of steel production. Among the major reasons for the scrapping or rejecting of such pots, which are usually made of cast steel, are cracking of pot walls or erosion of pot bottoms and side walls. Conventional bulk welding methods for the repair of such pots are costly, time-consuming, and usually unsatisfactory as the weldments often crack and fall out. In an attempt to improve the welding method and to lock in the weldment, V- or U-shaped notches or grooves or dove-tailed grooves are machined into the surface and the notches are filled with weld metal. This procedure has been generally successful, but remains quite costly. Attempts to fill cracks and erosion craters with ceramic material have failed. Steel plates, spiked into place over cracks and holes on the outside of the pots have been used to contain and prevent cracks from propagating further, but again, this type of repair is not completely satisfactory as molten metal or slag can still enter the cracks and holes making discharge extremely difficult.

In U.S. Pat. No. 3,629,928, Hammerle, a repair method is described in which a groove is first cut along the damaged area in a mold wall. A plurality of nails or bolts are anchored in the damaged area such that the heads thereof are exposed in the groove. The groove is filled with weld metal such that a breakout of the weld metal is minimized. Although successful, the method is very expensive.

In addition to the above, aluminothermic reduction (ATR) techniques have also been used in the past to repair large castings. Examples thereof may be found in U.S. Pat. Nos. 1,594,182, Millward; 2,515,191, Carpenter et al; 3,264,696, Funk; 3,396,776, Funk; 3,421,570, Guntermann; 3,933,191, Kachik et al; 3,942,578, Kachik et al; and 4,005,742, Kachik et al. In those processes, it is common practice to perform an appreciable amount of surface conditioning before the metal is deposited. For example, surface scale is usually removed from the casting and many thought it essential to undercut the casting surface so that the deposited metal is "keyed" in, i.e. locked in place so that it will not fall out even if it is not bonded to the casting. In addition, it has been thought necessary that the casting must be preheated in order to assure a good weld bond of the deposited metal. Since a given volume of ATR powder will yield only about a fifth as much deposited metal, by volume, it has always been necessary to use a containment perimeter to confine the ATR powder and ATR reaction products to the site to be repaired. That is to say, in order to fill a crater of given volume with a like volume of ATR deposited metal, the volume of ATR powder used must be five times greater. Hence, a refractory perimeter system is necessary to confine the ATR powder directly over the cavity to be filled. In addition, the perimeter system becomes necessary to similarly confine the molten reaction products which also have a volume greater than the cavity. That is, to yield a volume of metal equal to the volume of the cavity, an even greater volume of slag is necessarily produced. After the reaction is effected and while the reaction products are still in the molten condition, the heavier metal product will settle to the bottom filling the cavity, while the slag portion accumulates at the top within the volume defined by the refractory perimeter system. After the reaction products have solidified, the perimeter system and overlaying slag are removed, leaving the deposited metal in the cavity.

In U.S. Pat. No. 4,005,742, Kachik et at, a more simplified ATR method for repairing large iron castings is disclosed wherein a perimeter system is not utilized. In that method, which is primarily directed to filling erosion craters, a volume of ATR powder, equal to about 150% of the crater volume, is deposited and heaped into the crater and ignited. This volume of ATR powder will yield reaction products, i.e. both metal and slag, which will approximately fill the crater, with the metal settling to the bottom and the slag overlay being left in place to provide an abrasion resistant coating. Alternatively, it is taught that a plurality of ATR charges may be employed to provide a plurality of iron-slag layers within the cavity. Although this technique has been particularly effective for quickly repairing erosion craters in ingot molds and mold stools, it has not been helpful in some other applications where, for one reason or another, the slag overlay is not desired. In addition, that practice should not be used on excessively deep craters where the ATR reaction is apt to burn through the bottom of the casting.

This invention concerns a method for repairing large steel articles, such as slag and cinder pots as contrasted to cast iron articles, particularly a method of filling erosion craters therein, which employs an exothermic reduction reaction, such as an aluminothermic reduction reaction, and which does not require the above described complicated procedures, and does not utilize reaction product slag as filler material. This method does not require any surface conditioning, any preheating nor the use of a perimeter system, and may be used to fill craters where the bottom wall is too thin for other techniques. The chemical reaction can be represented as:

$$3MeO + 2Al \rightarrow 3Me + Al_2O_3 + heat$$

where MeO represents the oxide of the metal to be deposited, such as hematite ($Fe_2O_3$), Al is the aluminum fuel and $Al_2O_3$ the oxide of aluminum, which is a major constituent of the resulting slag. The ATR charge, consisting of a stoichiometric mixture of aluminum and iron oxide, is placed within the defective area such as an erosion pit, etc. Since the reaction takes place and the superheated metal is generated in intimate contact with the substrate surface instead of in a crucible as is a more common practice, the heat of reaction is efficiently utilized, thereby enhancing the bonding of the deposited metal to the steel substrate.

It is the primary object of this invention to provide a method of repairing large steel articles such as slag and cinder pots which requires no surface preparation of the casting, no preheating and no perimeter system.

It is another object to provide a method of repairing large steel articles which is quick and economical.

It is also an object to provide a method of repairing large steel articles that can be performed without elaborate or expensive equipment.

It is another object to provide a method of repairing slag and cinder pots that can be performed without removing the pots from the cars on which they are mounted.

It is a further object to provide a method of repairing large steel articles wherein a plurality of ATR charges are used successively to fill in an erosion cavity or the like.

These and other objects will become more readily apparent by reference to the following detailed specification and the attached drawings in which.

Figure 1:
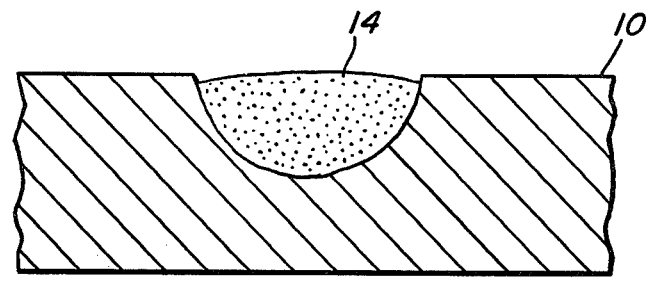
FIG. 1 is a transverse cross-section of an eroded pot wall section containing the first of several ATR charges.
Figure 2:
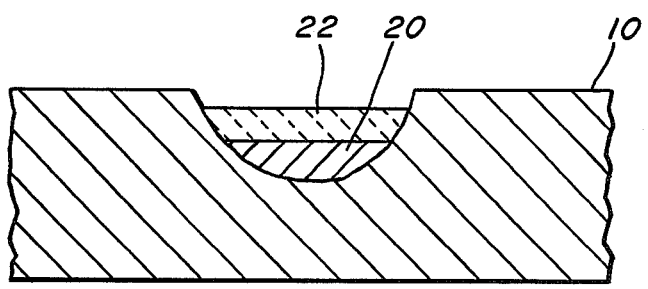
FIG. 2 is a transverse cross-section of the pot wall section shown in FIG. 1 after the first ATR charge has been reacted.
Figure 3:
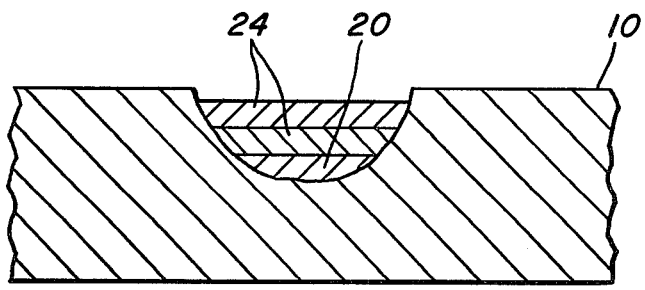
FIG. 3 is a transverse cross-section of the pot wall section shown in FIGS. 1 and 2 after the repair has been completed.

As shown in FIG. 1, a pot wall 10 has been eroded in service to such an extent that a crater 12 exists in the surface thereof. We repair this pot by placing a first exothermic reaction mixture 14 inside the crater 12. The mixture 14 is deposited in an amount insufficient to overflow the crater 12, which thereby avoids any need for a perimeter system. Ideally, the mixture 14 should be about equal in volume to the volume of crater 12. The mixture 14 is preferably an aluminothermic reduction (ATR) reaction mixture. The mixture consists of about three parts powdered iron oxide, which is preferably $Fe_2O_3$ and not finer than +200 mesh, and preferably having a size at least as fine as −35 mesh, one part aluminum powder preferably having a size between about −100 mesh and −400 mesh. Preferably, the mix should also contain about 10% lime to slow the reaction rate and minimize porosity. Other fuels that might be used instead of aluminum are magnesium, calcium, silicon and calcium-silicon alloy or mixtures thereof. The ATR mixture 14 is ignited by a flame, flare or hot filament. The reaction causes the formation of a superheated melt comprising a metal phase 20 (FIG. 2) and a slag phase 22. The more dense metal phase quickly separates from the melt and settles to the bottom where it becomes metallurgically bonded to the bottom of the crater 12. Any oxide scale which may have existed on the surface of crater 12 is either chemically reduced or melted with the overlaying slag phase 22. It is believed that this "in situ" bulk deposition process uses the heat of reaction efficiently to provide a mechanism for cleaning and descaling the surfaces, thereby enhancing the formation of additional filler material which becomes welded to the pot. Upon cooling a metal phase 20 has been weld bonded to the bottom of crater 12. The overlaying slag phase 22, although firmly attached to the metal phase 20 therebeneath, must be removed before proceeding further. When cooled, slag phase 22 can be removed without much difficulty by fracturing the slag into pieces which can then be easily lifted or blown from the surface of metal phase 20. Once the slag phase 22 has been removed, the entire procedure is repeated one or more times until crater 12 has been substantially filled with metal deposited as one or more layers 24 on top of metal phase 20 as shown in FIG. 3. In subsequent ATR charges, it may be desirable to provide a volume of ATR mixture somewhat greater than the volume remaining in the crater in order to assure that a useful amount of metal is deposited. This can be done by heaping the ATR within the remaining cavity or, if desired, a dam made of slag from the preceding charge can be used to make a crude containment system.

In earlier efforts to deposit an ATR metal within such a cavity as shown in the above description, it was thought that the base metal casting had to be substantially preheated prior to application of the ATR mixture in order to assure sufficient heat at the solid-liquid interface to weld-bond the ATR metal to the cavity wall. In the practice of this invention, however, such a preheat is not necessary. That is to say, such a preheat is not necessary prior to deposition of the first ATR reaction metal product. On subsequent depositions, however, it may be advantageous to effect each such subsequent deposition before the preceding deposit has cooled excessively thereby taking advantage of that preheat to minimize minute cracking and structural stress that could otherwise result. While such preheating is not essential, it is preferred, and accordingly to take advantage thereof, each ATR charge should be at least 50 pounds in weight, and ideally about 75 to 100 pounds. Since the slag phase is usually removed in prior art single deposit practices, it was necessary therefore to provide sufficient ATR mixture so that the entire crater was filled with the reaction metal. The overlaying slag phase was then broken-away and discarded. Since a considerably greater amount of deposited metal was necessary, a correspondingly greater amount of ATR mixture was necessary. As noted above, this then necessitated building or placing a refractory containment perimeter system around the cavity to contain the extra ATR mixture and reaction products so that the metal would enter and essentially fill the cavity, the overlaying slag phase would then have to be contained by a suitable perimeter system. In practice, it was found necessary that the loose ATR mixture have a volume of approximately six times greater than the volume of the cavity. In the above practice, however, wherein approximately the same ATR mixture is provided in a plurality of separate charges and reactions and the product slag removed between charges, a refractory perimeter system is not necessary, and hence the repair can be effected without the need of any apparatus whatsoever.

The above embodiment describes a method of filling a cavity in a slag pot 10. It should be realized, however, that the exact same procedure could be used for filling a cavity in other heavy steel articles.

The following detailed example is presented to better illustrate one embodiment of this invention.

In one particular steel mill a large number of slag and cinder pots are used in the BOP and blast-furnace steelmaking operations. In service, these cast-steel pots are subjected to conditions which promote cracking of the pot walls and/or erosion of the interior wall surfaces. To maintain the pots in usable condition, prior practice has been to use manual welding procedures.

In the initial trial of this inventive process, one cinder pot which had a saucer-shaped washout measuring about 2 feet in diameter and 3 inches in depth in its interior wall surface, was selected for repair. The pot was positioned such that the plane of the washout area was approximately horizontal. After the surface of the washout was brushed to remove loose dirt and debris, three 25-pound bags of ATR reaction mixture, consisting of a stoichiometric blend of iron ore and aluminum plus an addition of 10 percent lime (CaO), were placed in the cavity and ignited with a railroad fuse. After the reaction was complete, reaction time was less than 1 minute, and the reaction products had cooled below red heat, the ATR slag phase was removed with the aid of an air-powered chisel to expose the ATR weld deposit.

The results of the first deposition were encouraging. The ATR weld metal appeared to bond to the pot, and the surface of the patch was relatively smooth and flat. Although there were small bonding flaws along the edges of the deposit and several small shrinkage-type cracks in the weld metal, these imperfections were minor. It appeared that the ATR mixture was satisfactory for use as a filler material.

The above procedure was repeated, eventually five times, using either 75 or 100 pounds of charge, for a total of 525 pounds of ATR mixture. During the last few treatments, the pot was tilted and/or rotated slightly between treatments to enable the filling of any remaining low spots. Each successive ATR deposit appeared to bond to the surface of the previous ATR patch and to the pot material along the edge of the patch. Service performance of this, and other similarly repaired pots has been excellent.

I claim:

1. A method of repairing an erosion cavity in slag and cinder pots, and other heavy steel articles comprising
   (a) placing into said cavity an exothermic reaction mixture comprising a fuel powder and a metal oxide, the amount of said mixture having a volume insufficient to overflow said cavity,
   (b) igniting said mixture to form a superheated melt comprising a metal phase and a slag phase, such that the melt is substantially contained entirely within said cavity,
   (c) maintaining said melt in said cavity for a time sufficient to allow said melt to separate so that said metal phase settles to the bottom with the slag phase thereover,
   (d) permitting said melt to solidify with the metal phase securely bonded in the bottom of said cavity,
   (e) removing said slag phase to expose the metal phase and the remaining unfilled portion of the cavity, and
   (f) repeating steps (a) through (e) at least one more time to provide a plurality of metal phase layers which fill at least a significant portion of the cavity.

2. A method according to claim 1 in which said fuel powder is aluminum.

3. A method according to claim 2 in which said aluminum powder has a size consisting of $-100$ mesh and $+400$ mesh.

4. A method according to claim 1 in which said metallic oxide is $Fe_2O_3$.

5. A method according to claim 4 in which said $Fe_2O_3$ is at least as fine as $-35$ mesh.

6. A method according to claim 1 in which said fuel powder is aluminum and said metallic oxide is $Fe_2O_3$ and said mixture further contains approximately 10% lime.

7. A method according to claim 1 in which said mixture is provided in an amount of at least 50 pounds, but not more than 100 pounds.

8. A method according to claim 7 in which the subsequent exothermic reaction mixtures provided pursuant to step (f) are placed into the cavity and ignited while said casting is still hot from the preceding reaction.

* * * * *